US007127344B2

(12) United States Patent
Katoh

(10) Patent No.: US 7,127,344 B2
(45) Date of Patent: Oct. 24, 2006

(54) ENGINE AIR-FUEL RATIO CONTROL SYSTEM

(75) Inventor: Hiroshi Katoh, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/236,581

(22) Filed: Sep. 28, 2005

(65) Prior Publication Data

US 2006/0065257 A1 Mar. 30, 2006

(30) Foreign Application Priority Data

Sep. 29, 2004 (JP) ............................ 2004-282899

(51) Int. Cl.
*B60T 7/12* (2006.01)
*F02B 23/00* (2006.01)

(52) U.S. Cl. ...................................... 701/103; 123/687

(58) Field of Classification Search ................ 701/101, 701/103, 104, 114, 115; 123/434, 674, 681, 123/685, 688, 691

See application file for complete search history.

(56) References Cited

U.S. PATENT DOCUMENTS 4,669,439 A * 6/1987 Mamiya et al. ............. 123/674
5,381,767 A * 1/1995 Kikuchi ................. 123/339.15
5,887,421 A * 3/1999 Mitsutani ..................... 60/274
6,591,822 B1 * 7/2003 Dohta ........................ 123/672
6,644,291 B1 * 11/2003 Stroh et al. ................. 123/674
7,047,123 B1 * 5/2006 Katoh ........................ 701/104
2002/0005192 A1 * 1/2002 Dohta ........................ 123/674
2003/0172914 A1 * 9/2003 Stroh et al. ................. 123/674
2005/0022504 A1 * 2/2005 Miura ......................... 60/274
2005/0022516 A1 * 2/2005 Miura ......................... 60/295
2006/0016441 A1 * 1/2006 Sakaguchi et al. .......... 123/682
2006/0065257 A1 * 3/2006 Katoh ........................ 123/688

FOREIGN PATENT DOCUMENTS

JP 09-177580 A 7/1997
JP 10-110645 A 4/1998

* cited by examiner

*Primary Examiner*—John T. Kwon
(74) *Attorney, Agent, or Firm*—Global IP Counselors, LLP

(57) ABSTRACT

An engine air-fuel ratio control system is configured to use a rich air-fuel ratio immediately after starting an engine such that the air-fuel ratio converge rapidly toward a stoichiometric value and then afterwards start an air-fuel ratio feedback control. Upon determining an air-fuel ratio sensor is active based on the output of the air-fuel ratio sensor and the amount of time elapsed since an engine was started, a stabilization fuel quantity increasing value that is a component of a target air-fuel ratio revising coefficient is decreased at a higher rate than the rate used before the air-fuel ratio sensor was determined to be active. During the same period, an air-fuel ratio feedback revising coefficient is held at a reference value. After the output of the air-fuel ratio sensor reaches a value corresponding to a stoichiometric air-fuel ratio, an air-fuel ratio feedback control is started.

16 Claims, 5 Drawing Sheets

ENGINE AIR-FUEL RATIO CONTROL SYSTEM

CROSS-REFERENCE TO RELATED APPLICATIONS

This application claims priority under 35 U.S.C. § 119 to Japanese Patent Application No. 2004-282899. The entire disclosure of Japanese Patent Application No. 2004-282899 is hereby incorporated herein by reference.

BACKGROUND OF THE INVENTION

1. Field of the Invention

The present invention generally relates to an engine air-fuel ratio control system. More specifically, the present invention relates to an air-fuel ratio control system configured to run the engine with a rich air-fuel ratio immediately after the engine is started and start feedback control of the air-fuel ratio afterwards such that the air-fuel ratio converge rapidly toward the stoichiometric point.

2. Background Information

Presently, many engine air-fuel ratio control systems that compute and control a fuel injection quantity of an engine. For example, Japanese Laid-Open Patent Publication No. 9-177580 and Japanese Laid-Open Patent Publication No. 10-110645 disclose engine air-fuel ratio control systems that compute and control a fuel injection quantity of an engine. These engine air-fuel ratio control systems set the air-fuel ratio to be enriched immediately after the engine is started and then gradually decreased over time such that the air-fuel ratio gradually converges toward a stoichiometric value. More specifically, a fuel injection quantity of an engine is computed and controlled using a target air-fuel ratio revising coefficient whose constituent values include a stabilization fuel quantity increasing factor that is set such that the air-fuel ratio is richened immediately after the engine is started and gradually decreased over time such that the air-fuel ratio gradually converges toward a stoichiometric value. The calculation of the stabilization fuel quantity increasing factor includes a compensation for the engine rotational speed and the load. Furthermore, an air-fuel ratio feedback revising coefficient that is set such that the air-fuel ratio converges toward a stoichiometric value based on a signal from an air-fuel ratio sensor when an air-fuel ratio feedback control condition is satisfied.

In such engine air-fuel ratio control systems, after the air-fuel ratio sensor is determined to be active, the stabilization fuel quantity increasing factor is set to 0 and the amount by which the stabilization fuel quantity increasing factor was decreased in order to reach 0 (i.e., the value of the stabilization fuel quantity increasing factor at that point in time) is added to the air-fuel ratio feedback revising coefficient, thereby increasing the value of the air-fuel ratio feedback revising coefficient. Then, an air-fuel quantity feedback control is started and an unburned fuel quantity compensating value (unburned fuel quantity balancing value) is then added to the calculation of the target air-fuel ratio revising coefficient. The unburned fuel quantity compensating value serves to ensure stability when a heavy fuel is used, and is set to make the equivalence ratio λ equal 0 when a heavy fuel is used.

In view of the above, it will be apparent to those skilled in the art from this disclosure that there exists a need for an improved engine air-fuel ratio control system. This invention addresses this need in the art as well as other needs, which will become apparent to those skilled in the art from this disclosure.

SUMMARY OF THE INVENTION

It has been discovered that in the engine air-fuel ratio control system described above, the stabilization fuel quantity increasing factor is set to achieve a rich air-fuel ratio before the air-fuel ratio sensor becomes active to ensure a sufficient fuel quantity is delivered to the engine. When the air-fuel ratio becomes active and the air-fuel ratio feedback control starts, the equivalence ratio λ is adjusted to 1 using the air-fuel ratio feedback revising coefficient, but the adjustment is restricted by the gain of the air-fuel ratio feedback control. Consequently, if the stabilization fuel quantity increasing factor is large when the system starts air-fuel ratio feedback control, then the air-fuel ratio will remain rich until it converges to the stoichiometric value.

Additionally, since the unburned fuel quantity compensating value, added after the air-fuel ratio feedback control starts, is set from the standpoint of ensuring stability for heavy fuels, the air-fuel ratio will become rich if a light fuel is used. Thus, the exhaust emissions will be in a degraded state until the equivalence ratio λ is adjusted to 1 using the air-fuel ratio feedback revising coefficient.

The present invention was conceived in view of these issues. One object of the present invention is to provide an engine air-fuel ratio control system that can make the air-fuel ratio converge rapidly toward the stoichiometric point (value).

In order to achieve the aforementioned object, an engine air-fuel ratio control system is provided that basically comprises an air-fuel ratio setting section, an air-fuel ratio sensor detection section, a target air-fuel ratio revision section and an air-fuel ratio feedback control section. The air-fuel ratio setting section is configured to set an air-fuel ratio for an engine based on at least one engine operating condition. The air-fuel ratio sensor detection section is configured determine a status of an air-fuel ratio sensor. The target air-fuel ratio revision section is configured to set a target air-fuel ratio revising coefficient to richen the air-fuel ratio immediately after the engine is started and afterwards to gradually decrease the air-fuel ratio over time to gradually converge towards a stoichiometric value, with the target air-fuel ratio revising coefficient decreasing at a higher rate upon determining the air-fuel ratio sensor to be active than a prior decreasing rate before determining the air-fuel ratio sensor to be active. The air-fuel ratio feedback control section is configured to set an air-fuel ratio feedback revising coefficient to perform an air-fuel ratio feedback control that converges the air-fuel ratio towards the stoichiometric value based on a signal from the air-fuel ratio sensor when an air-fuel ratio feedback control condition is satisfied. The air-fuel ratio feedback control section is further configured to hold the air-fuel ratio feedback revising coefficient at a reference value for a prescribed amount of time after the air-fuel ratio feedback control condition is satisfied and start the air-fuel ratio feedback control after the prescribed amount of time has elapsed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
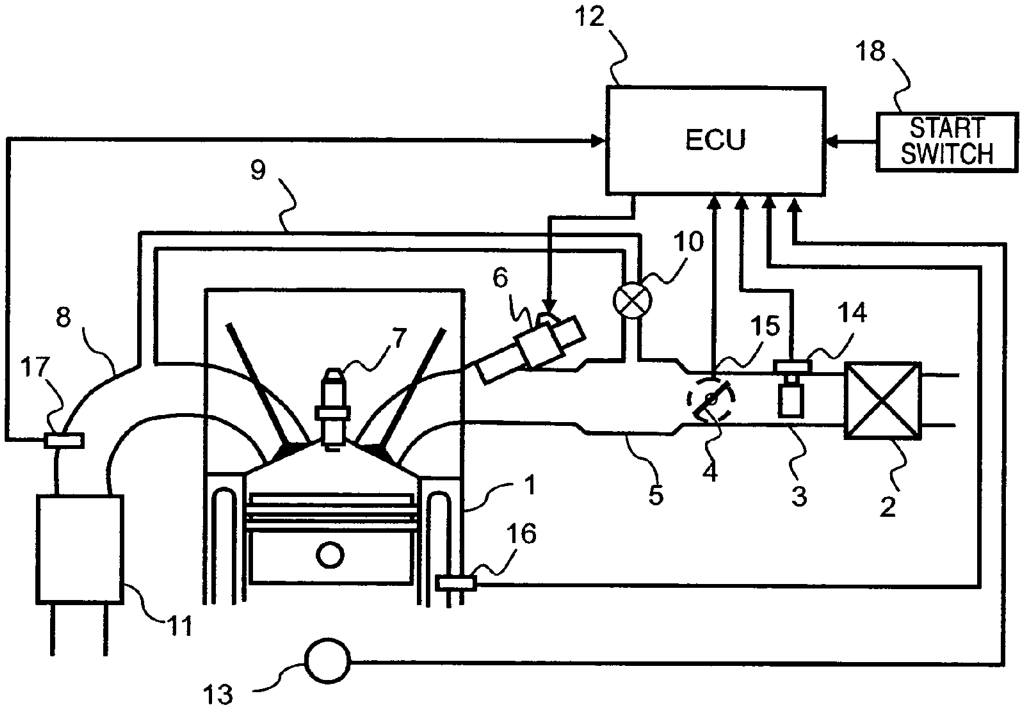
FIG. 1 is a simplified overall schematic view of an internal combustion engine provided with an engine air-fuel ratio control system in accordance with a preferred embodiment of the present invention.

Referring initially to FIG. 1, an internal combustion engine 1 is schematically illustrated that is provided with an engine air-fuel ratio control system in accordance with a first embodiment of the present invention. As seen in FIG. 1, air is drawn into the engine 1 through an air cleaner 2 into an air intake duct 3 that has an electronic throttle valve 4 to regulate the air flow an air intake manifold 5. The air intake manifold 5 divides the air flow into several streams for delivering intake air to the combustion chamber of each cylinder of the engine 1. A fuel injection valve 6 is provided in each runner (branch) of the intake manifold 5 such that there is one fuel injection valve 6 for each cylinder. It is also acceptable to arrange the fuel injection valves 6 such that they face directly into the combustion chambers of the respective cylinders, in needed and/or desired.

Each fuel injection valve 6 is an electromagnetic fuel injection valve (injector) configured to open when a solenoid thereof is electrically energized and close when the electricity is stopped.

An engine control unit (ECU) 12 controls the operation of the throttle valve 4 and the fuel injection valve 6 to regulate the air-fuel ratio to the engine 1. Thus, the engine control unit 12 issues a drive pulse signal that electrically controls the throttle valve 4 and a drive pulse signal that electrically energizes the solenoid and opens each fuel injection valve 6. A fuel pump (not shown) pressurizes the fuel and the pressurized fuel is adjusted to a prescribed pressure by a pressure regulator and delivered to the fuel injection valves 6. Thus, the pulse width of the drive pulse signal controls the fuel injection quantity.

A spark plug 7 is provided in the combustion chamber of each cylinder of the engine 1 and serves to produce a spark that ignites and air-fuel mixture, causing the air-fuel mixture to combust.

The exhaust gas from each combustion chamber of the engine 1 is discharged through an exhaust manifold 8. An EGR passage 9 leads from the exhaust manifold 8 to the intake manifold 5 so that a portion of the exhaust gas can be recirculated to the intake manifold 5 through an EGR valve 10. An exhaust gas cleaning catalytic converter 11 is provided in the exhaust passage at a position directly downstream of the exhaust manifold 8.

The engine control unit 12 preferably includes a microcomputer having an air-fuel ratio control program that controls the air intake quantity by regulating the throttle valve 4 and that controls the fuel injection quantity of the fuel injection valves 6, as discussed below, as well as other programs to operate the engine 1. The engine control unit 12 preferably includes other conventional components such as an input interface circuit, an output interface circuit, an analog-to-digital converter, storage devices such as a ROM (Read Only Memory) device and a RAM (Random Access Memory) device, etc. The engine control unit 12 receives input signals from various sensors and executes computer processing (described later) so as to control the operation of the throttle valve 4 and/or the fuel injection valves 6 to adjust the air-fuel ratio. It will be apparent to those skilled in the art from this disclosure that the precise structure and algorithms for the engine control unit 12 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The aforementioned various sensors include, but not limited to, a crank angle sensor 13, an air flow meter 14, a throttle sensor 15, a coolant temperature sensor 16 and an air-fuel ratio sensor (oxygen sensor) 17. The crank angle sensor 13 is configured and arranged to detect the crank angle of the engine 1 based on the rotation of the crankshaft or the camshaft and also to detect the engine rotational speed Ne. The air flow meter 14 is configured and arranged to detect the intake air quantity Qa inside the air intake duct 3. The throttle sensor 15 is configured and arranged to detect the opening degree TVO of the throttle valve 4 (it is acceptable for the throttle sensor 15 to be an idle switch that turns ON when the throttle valve 4 is fully closed). The coolant temperature sensor 16 is configured and arranged to detect the temperature TW of the coolant of the engine 1. The air-fuel ratio sensor (oxygen sensor) 17 is arranged in the collector section of the exhaust manifold and configured to issue a signal indicating if the air-fuel ratio is rich or lean. Instead of using a normal oxygen sensor as the air-fuel ratio sensor 17, it is also acceptable to use a wide-range air-fuel ratio sensor capable of producing a signal that is proportional to the air-fuel ratio. It is also acceptable for the air-fuel ratio sensor 17 to be provided with an internal heating element that is used to raise the temperature of the detection element when the engine is started so as to activate the sensor earlier. The engine control unit 12 also receives a signal from a start switch 18.

The engine control unit 12 primarily forms the engine air-fuel ratio control system of the present invention. Thus, the engine control unit 12 is configured to comprise an air-fuel ratio setting section, an air-fuel ratio sensor detection section, a target air-fuel ratio revision section and an air-fuel ratio feedback control section. The air-fuel ratio setting section is configured to set an air-fuel ratio for an engine based on at least one engine operating condition, e.g. set a basic fuel injection quantity (basic injection pulse width) Tp for the engine 1 based on at least one engine operating condition as explained below. The air-fuel ratio sensor detection section is configured determine a status of the air-fuel ratio sensor 17. The target air-fuel ratio revision section is configured to set a target air-fuel ratio revising coefficient TFBYA based on at least a stabilization fuel quantity increasing factor t KSTB hat is set to richen the air-fuel ratio immediately after the engine 1 is started and afterwards to gradually decrease the air-fuel ratio over time to gradually converge towards a stoichiometric value, with the stabilization fuel quantity increasing factor KSTB decreasing at a higher rate upon determining the air-fuel ratio sensor 17 to be active than a prior decreasing rate before determining the air-fuel ratio sensor 17 to be active. The air-fuel ratio feedback control section is configured to set an air-fuel ratio feedback revising coefficient ALPHA to perform an air-fuel ratio feedback control that converges the air-fuel ratio towards the stoichiometric value based on a signal from the air-fuel ratio sensor 17 when an air-fuel ratio feedback control condition is satisfied. The air-fuel ratio feedback control section is further configured to hold the air-fuel ratio feedback revising coefficient ALPHA at a reference value for a prescribed amount of time after the air-fuel ratio feedback control condition is satisfied and start the air-fuel ratio feedback control after the prescribed amount of time has elapsed. The target air-fuel ratio revision section is further configured to revise the target air-fuel ratio revising coefficient TFBYA when the air-fuel ratio feedback control is started by adding an unburned fuel quantity compensating value KUB that is set based on the stabilization fuel quantity increasing factor KSTB in effect at that point in time to the target air-fuel ratio revising coefficient TFBYA while, simultaneously, setting the stabilization fuel quantity increasing factor KSTB to zero as explained below.

With the present invention, as explained below, the equivalence ratio λ can be adjusted to 1 at the maximum speed allowable in view of the operating performance of the engine 1 without being restricted by the normal gain of the air-fuel ratio feedback control (i.e., the gain that is in effect in normal operating regions). Also, even if the feedback control starts when the engine 1 is in a region where the air-fuel ratio is in a rich, overshooting resulting from excessive revision of the air-fuel ratio feedback revising coefficient ALPHA can be prevented.

The computation of the fuel injection quantity Ti by the engine control unit 12 will now be described.

First, the engine control unit 12 reads in the intake air quantity Qa detected by the air flow meter 14 and the engine rotational speed Ne detected by the crank angle sensor 13 and calculates the basic fuel injection quantity (basic injection pulse width) Tp corresponding to a stoichiometric air-fuel ratio using the equation shown below. In the equation, the term K is a constant.

$$TP = K \times Qa/Ne$$

The engine control unit 12 then reads in the target air-fuel ratio revising coefficient TFBYA and the air-fuel ratio feedback revising coefficient ALPHA, which are set separately. The engine control unit 12 then calculates the final fuel injection quantity (injection pulse width) Ti using the equation shown below.

$$Ti = Tp \times TFBYA \times \mathrm{ALPHA}$$

The reference values (values corresponding to a stoichiometric air-fuel ratio) of the target air-fuel ratio revising coefficient TFBYA and the air-fuel ratio feedback revising coefficient ALPHA are both 1.

The computation of the fuel injection quantity (injection pulse width) Ti also includes a transient compensation based on the throttle valve opening degree TVO and an arithmetic addition of a non-effective injection pulse width based on the battery voltage, but these factors have been omitted for the sake of brevity.

Once the fuel injection quantity Ti is calculated, the engine control unit 12 sends a drive pulse signal having a pulse width corresponding to the value of the fuel injection quantity Ti to the fuel injection valve 6 of each cylinder at a prescribed timing synchronized with the engine rotation, thereby executing fuel injection.

The setting of the target air-fuel ratio revising coefficient TFBYA will now be described.

The target air-fuel ratio revising coefficient TFBYA is calculated by multiplying a basic target air-fuel ratio revising coefficient TFBYA0 by a compensation coefficient THOS.

$$TFBYA = TFBYA0 \times THOS$$

The basic target air-fuel ratio revising coefficient TFBYA0 is a target air-fuel ratio assigned to each operating region determined based on the engine rotational speed and the engine load using a map that plots the basic target air-fuel ratio revising coefficient TFBYA0 versus the engine rotational speed and the load (e.g., target torque). The basic target air-fuel ratio revising coefficient TFBYA0 equals 1 in normal (stoichiometric) operating regions (regions other than a high rotational speed/high load region) because the engine is operated with a stoichiometric air fuel ratio. Meanwhile, TFBYA0 is larger than 1 in a high rotational speed/high load (rich) operating region (KMR region) because the engine is operated with a rich air-fuel ratio.

The compensation coefficient THOS is calculated using the equation shown below. The reference value is 1 and such values as a stabilization fuel quantity increasing factor KSTB and an unburned fuel quantity compensating value KUB are added to the reference value to calculate the compensation coefficient THOS as well as other factors as needed (not shown for the sake of simplicity).

$$THOS = 1 + KSTB + KUB +$$

The stabilization fuel quantity increasing factor KSTB is set such that the air-fuel ratio is richened immediately after the engine 1 is started, and afterwards the a stabilization fuel quantity increasing factor KSTB is gradually decreased over time such that the air-fuel ratio gradually converges toward the stoichiometric value. Preferably, the calculation of the stabilization fuel quantity increasing factor KSTB is set to compensate for the engine rotational speed and the load (e.g., target torque). The degree to which the stabilization fuel quantity increasing factor KSTB makes the air-fuel ratio more rich also depends on the coolant temperature, i.e., the lower the coolant temperature, the more the air-fuel ratio is richened.

Once the stabilization fuel quantity increasing factor KSTB is set to 0, the unburned fuel quantity compensating value KUB is set in such a manner that stability can be ensured even if a heavy fuel is being used. The unburned fuel quantity compensating value KUB is contrived to make λ equal 1 when a heavy fuel is used.

The setting of the air-fuel ratio feedback revising coefficient ALPHA will now be described.

The air-fuel ratio feedback revising coefficient ALPHA is increased and decreased in the following manner. When the air-fuel ratio feedback control conditions are satisfied (at least one condition being that the air-fuel ratio sensor 17 is active), then the engine control unit 12 begins checking the output signal from the air-fuel ratio sensor 17 to determine if the air fuel ratio is rich or lean. If a rich-to-lean transition point is reached (i.e., if the current output value is lean, but the previous output value was rich), the engine control unit 12 increases the air-fuel ratio feedback revising coefficient ALPHA by a proportional amount (proportion gain) P that is set to a comparatively large value (i.e., ALPHA=ALPHA+P). Thereafter, so long as the air-fuel ratio continues to be lean, the engine control unit 12 increases the air-fuel ratio feedback revising coefficient ALPHA by a very small integral amount (integral gain) I (i.e., ALPHA=ALPHA+I).

Conversely, if a lean-to-rich transition point is reached (i.e., if the current output value is rich but the previous output value was lean), then the engine control unit 12 decreases the air-fuel ratio feedback revising coefficient ALPHA by a proportional amount (proportion gain) P that is set to a comparatively large value (i.e., ALPHA=ALPHA−P). Thereafter, so long as the air-fuel ratio continues to be rich, the engine control unit 12 decreases the air-fuel ratio feedback revising coefficient ALPHA by a very small integral amount (integral gain) I (i.e., ALPHA=ALPHA−I).

When the air-fuel ratio feedback control conditions are not satisfied, the air-fuel ratio feedback revising coefficient ALPHA is held at the reference value 1 or at the last value it had when air-fuel ratio feedback control ended.

Figure 2:
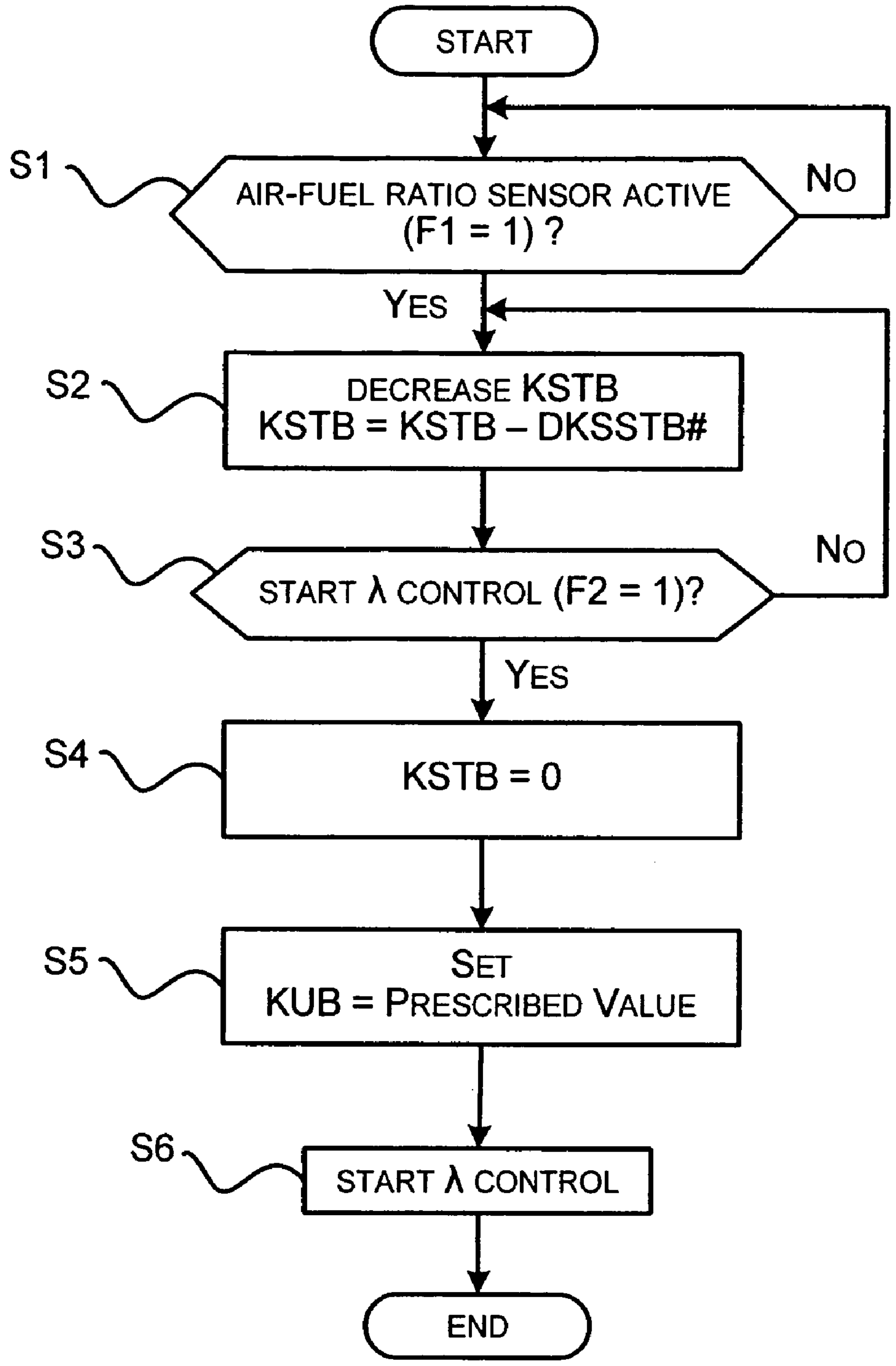
FIG. 2 is a flowchart of a control routine executed by the engine air-fuel ratio control system used to carry out the steps of a post-start air-fuel ratio control in accordance with the preferred embodiment of the present invention.
Figure 5:
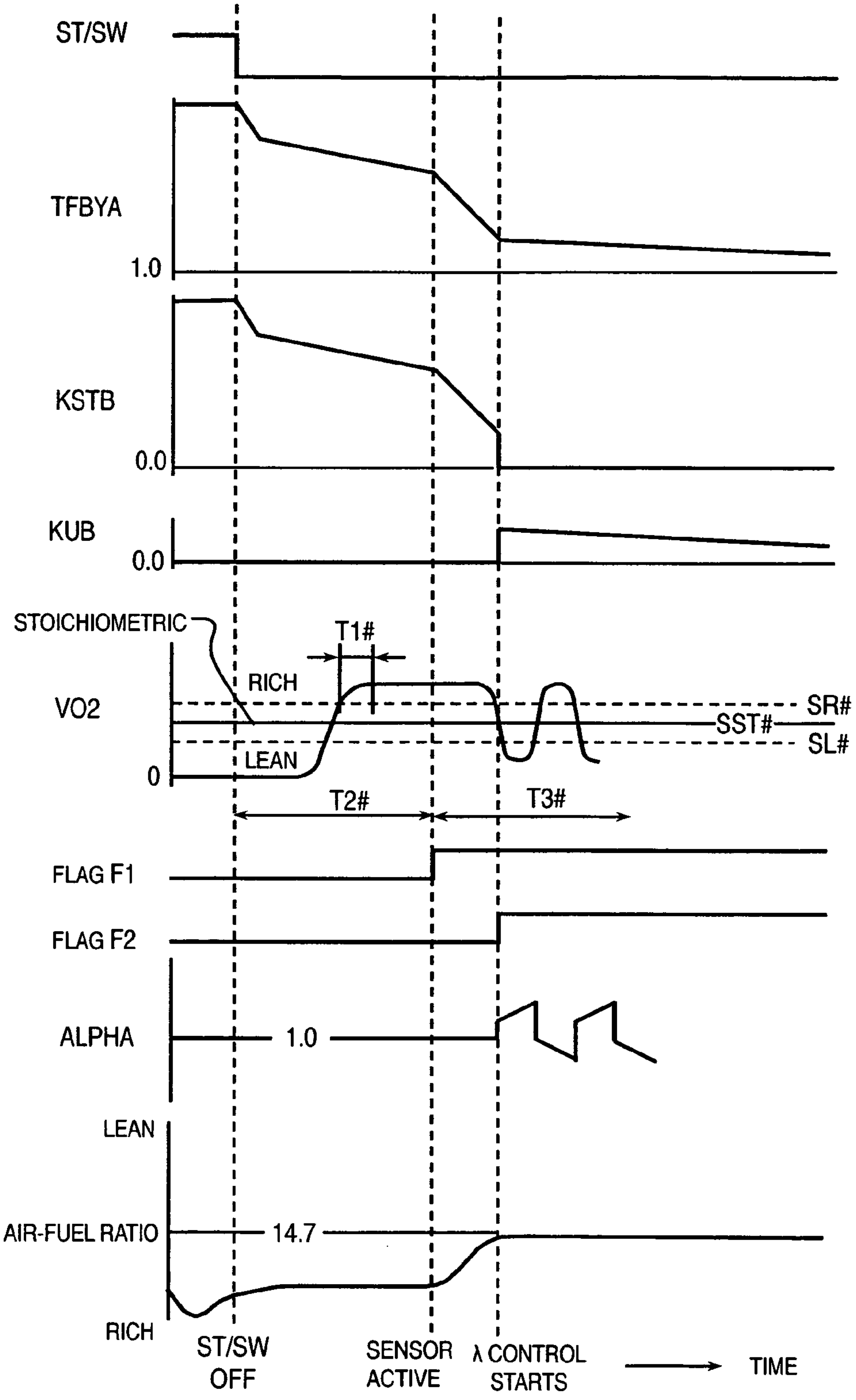
FIG. 5 is a first time chart illustrating the post-start air-fuel ratio control in accordance with the preferred embodiment of the present invention.

FIG. 2 is a flowchart showing the steps of the air-fuel ratio control from immediately after the engine 1 is started (i.e., when the start switch status changes from ON to OFF) until the air-fuel ratio feedback control starts. FIG. 5 is a time chart corresponding to the same control steps.

In step S1, after the engine 1 is started, the engine control unit 12 determines if the air-fuel ratio sensor 17 is active.

Figure 3:
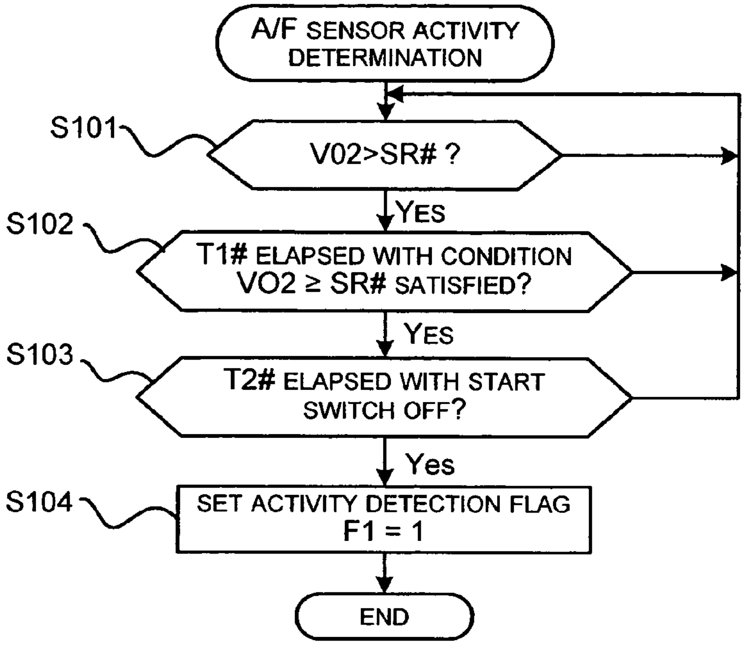
FIG. 3 is a flowchart of a control routine executed by the engine air-fuel ratio control system used to determine if the air-fuel ratio sensor is active in accordance with the preferred embodiment of the present invention.

The activity determination is executed according to the flowchart shown in FIG. 3. In step S101, the engine control unit 12 determines if the output VO2 of the air-fuel ratio sensor 17 is equal to or larger than a predetermined rich activity level SR#. If the result of step S101 is YES, then the engine control unit 12 proceeds to step S102 and determines if a prescribed amount of time T1# has elapsed with the condition VO2≧SR# continuously satisfied. If the result of step S102 is YES, then the engine control unit 12 proceeds to step S103 where it determines if a prescribed amount of time T2# has elapsed since the start switch (ST/SW) turned OFF. If the result of step S103 is YES, i.e., if the determination results of the steps S101 to S103 are all YES, then the engine control unit 12 proceeds to step S104 where an activity detection flag F1 is set to 1 for indicating that the air-fuel ratio sensor 17 has been determined to be active.

Thus, in step S1, the engine control unit 12 determines if the activity detection flag F1 is 1.

During the period when the activity detection flag F1 is 0, i.e., from immediately after the engine 1 is started until the air-fuel ratio sensor 17 is determined to be active, the stabilization fuel quantity increasing factor KSTB is set such that the air-fuel ratio is richened to a degree in accordance with the coolant temperature (i.e., the lower the coolant temperature, the more the air-fuel ratio is richened). After the initial rich setting, the stabilization fuel quantity increasing factor KSTB is gradually decreased over time such that the air-fuel ratio gradually converges toward the stoichiometric value. Since the target air-fuel ratio revising coefficient TFBYA is at least partially determined by the stabilization fuel quantity increasing factor KSTB (because KUB=0), the target air-fuel ratio revising coefficient TFBYA is adjusted in the same manner, i.e., set to a rich value in accordance with the coolant temperature and then made to gradually converge toward the stoichiometric value. During this period, the air-fuel ratio feedback revising coefficient ALPHA is held at the reference value 1.

When the activity detection flag F1 changes to 1, i.e., when the air-fuel ratio sensor 17 is determined to be active, the engine control unit 12 proceeds to step S2.

In step S2, the engine control unit 12 begins decreasing the stabilization fuel quantity increasing factor KSTB at a higher rate than the rate at which it decreased the stabilization fuel quantity increasing factor KSTB before the air-fuel ratio sensor 17 was determined to be active. More specifically, the stabilization fuel quantity increasing factor KSTB is reduced by a prescribed reduction amount (DKSSTB#) per unit time (see equation below).

$$KSTB=KSTB-DKSSTB\#$$

Figure 4:
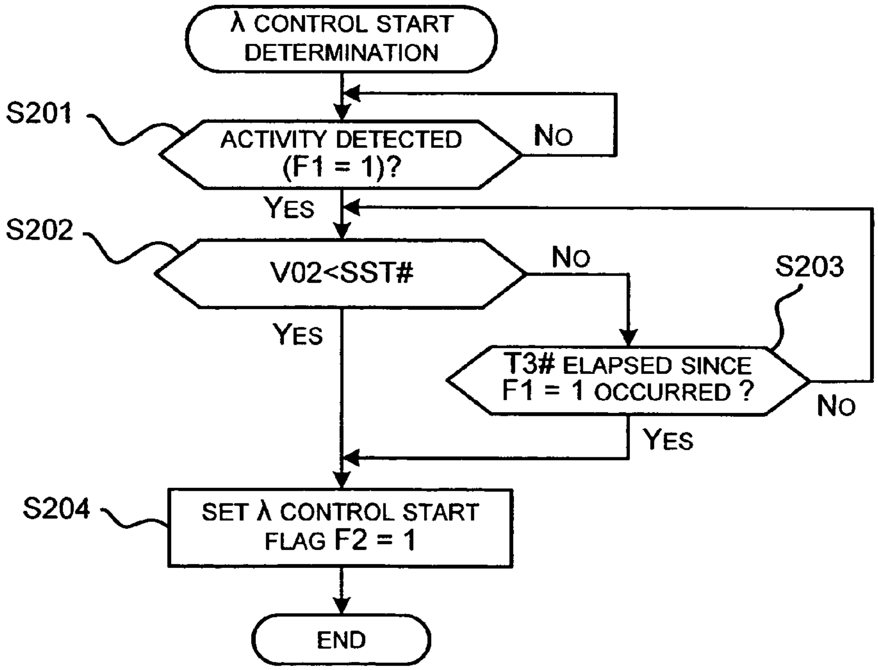
FIG. 4 is a flowchart of a control routine executed by the engine air-fuel ratio control system used to determine if the λ control should be started in accordance with the preferred embodiment of the present invention.

In step S3, the engine control unit 12 determines if the start conditions for air-fuel ratio feedback control (λ control) are satisfied. The determination as to whether or not the conditions for air-fuel ratio feedback control (λ control) are satisfied is made in accordance with the flowchart of FIG. 4. In step S201, the engine control unit 12 determines if the value activity determination flag F1 for the air-fuel ratio sensor 17 is 1. If the result of step S201 is YES, then the engine control unit 12 proceeds to step S202 where it determines if the output VO2 of the air-fuel ratio sensor 17 has reached a value SST# corresponding to a stoichiometric air-fuel ratio (VO2≦SST#).

If the result of step S202 is YES, then the engine control unit 12 determines that the conditions for the air-fuel ratio feedback control (λ control) are satisfied and proceeds to step S204, where it sets the λ control start flag F2 to 1. If the result of step S202 is NO, then the engine control unit 12 proceeds to step S203 and determines if a prescribed amount of time T3# has elapsed since it was determined that the air-fuel ratio sensor 17 is active (i.e., since F1=1). Here, too, if the result is YES, the engine control unit 12 determines that the conditions for the air-fuel ratio feedback control (λ control) are satisfied and proceeds to step S204, where it sets the λ control start flag F2 to 1.

Thus, in step S3, the engine control unit 12 determines if the value of the λ control start flag F2 is 1.

During the period when the λ control start flag F2 is 0, i.e., from the point in time when it is determined that the air-fuel ratio sensor 17 is active until the air-fuel ratio feedback control is started, the engine control unit 12 decreases the stabilization fuel quantity increasing factor KSTB until it reaches 0, the decreasing being executed at a higher rate (DKSSTB#) than the rate at which the stabilization fuel quantity increasing factor KSTB was decreased before the air-fuel ratio sensor 17 was determined to be active. Since the target air-fuel ratio revising coefficient TFBYA is primarily determined by the stabilization fuel quantity increasing factor KSTB (because KUB=0), the target air-fuel ratio revising coefficient TFBYA is decreased in the same manner. During this period, the air-fuel ratio feedback revising coefficient ALPHA is held at the reference value 1.

When the λ control start flag F2 changes to 1, i.e., when the start conditions for air-fuel ratio feedback control are satisfied, the engine control unit 12 proceeds to steps S4 to S6.

In step S4, the engine control unit 12 sets the stabilization fuel quantity increasing factor KSTB to 0 unconditionally (KSTB=0).

In step S5, the engine control unit 12 sets the unburned fuel quantity compensating value KUB to a prescribed value (a value well suited for heavy fuel). Since the target air-fuel ratio revising coefficient TFBYA is calculated with the equation TFBYA=TFBYA0×(1+KSTB+KUB+ . . . ), the target air-fuel ratio revising coefficient TFBYA is approximately equal to 1+KUB(TFBYA≈1+KUB) so long as TFBYA0 is 1.

In step S6, the engine control unit 12 starts air-fuel ratio feedback control (λ control). More specifically, the engine control unit 12 executes proportional and integral control to increase and decrease the setting value of the air-fuel ratio feedback revising coefficient ALPHA.

Figure 6:
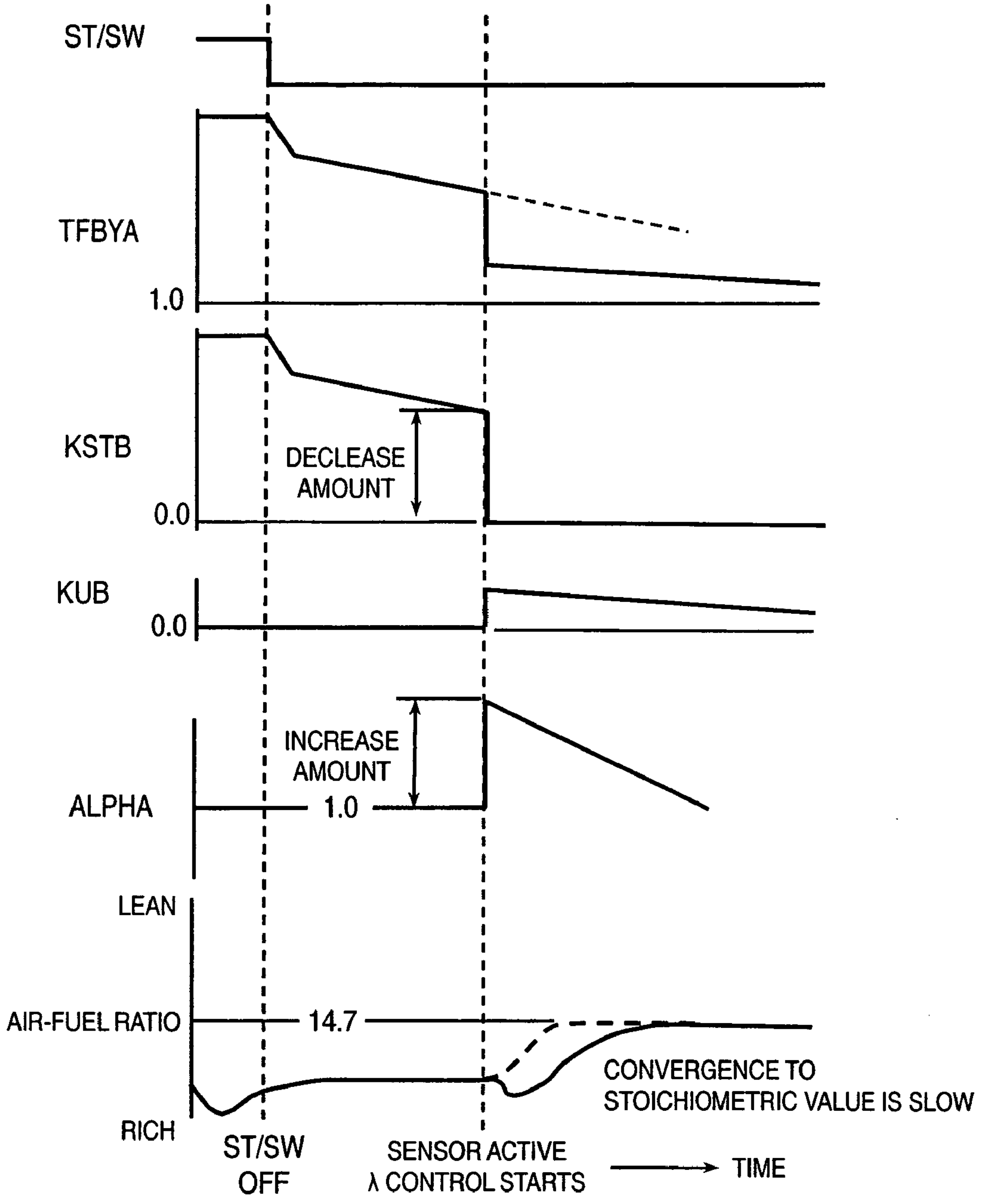
FIG. 6 is a time chart illustrating a conventional post-start air-fuel ratio control.

The control routine executed by the engine control unit 12 in this embodiment (FIG. 5) will now be described in comparison with the conventional post-start air-fuel ratio control shown in the time chart of FIG. 6 ("post-start" meaning control that is executed after the engine is started).

With the conventional post-start air-fuel ratio control (FIG. 6), depending on the values of the set constants, there are times when the exhaust emissions are not sufficiently reduced.

Firstly, since the stabilization fuel quantity increasing factor KSTB is added to the initial value of the air-fuel ratio feedback revising coefficient ALPHA when the air-fuel ratio feedback control (λ control) starts, the air-fuel ratio will be excessively revised (overcompensated) when the air-fuel ratio feedback control starts and the unburned fuel quantity compensating value KUB is added if an unburned fuel quantity compensating value is also included in the stabilization fuel quantity increasing factor KSTB. Such a situation can be avoided by setting the unburned fuel quantity compensating value KUB to 0, but this can be problematic because there will be no revision (compensation) quantity if the control becomes open loop after the air-fuel ratio feedback revising coefficient ALPHA converges.

Secondly, since value of the stabilization fuel quantity increasing factor KSTB at the point in time when the air-fuel ratio feedback control is started is used as the initial value of ALPHA, the initial value of ALPHA will be will be limited by an ALPHA limiter if the value of KSTB is large and thus a sufficient revision of ALPHA may not be possible. As a result, there is the possibility that the air-fuel ratio will become too lean.

Thirdly, since the change in the value of the air-fuel ratio feedback revising coefficient ALPHA after the fuel-air ratio feedback control starts is dominated by the integral gain (I), the convergence of ALPHA toward the stoichiometric value after the increase resulting from adding the stabilization fuel quantity increasing factor KSTB will be slow if the integral gain is small due to the demands of other regions because the integral gain will not become smaller than the slopes of KSTB and KUB.

Conversely, the control executed by this embodiment (FIG. 5) is as described below.

In this embodiment, the start of the air-fuel ratio feedback control (λ control) is delayed after the air-fuel ratio sensor 17 has been determined to be active and during the period from when the air-fuel ratio sensor 17 is determined to be active until the air-fuel ratio feedback control starts, the air-fuel ratio feedback revising coefficient ALPHA is clamped at 1 and the target air-fuel ratio revising coefficient TFBYA (actually, the stabilization fuel quantity increasing factor KSTB) is decreased until λ equals 1. As a result, the air-fuel ratio can be brought to the stoichiometric value rapidly regardless of the gain of the air-fuel ratio feedback revising coefficient ALPHA.

Also, in this embodiment, the air-fuel ratio feedback control is started either when the output of the air-fuel ratio sensor 17 indicates that λ equals 1 or when a prescribed amount of time has elapsed since the air-fuel ratio sensor 17 was determined to be active. The stabilization fuel quantity increasing factor KSTB is set to 0 when the feedback control starts, but the value of the stabilization fuel quantity increasing factor KSTB just before it is set to 0 is not added to the initial value of the air-fuel ratio feedback revising coefficient ALPHA. This approach is adopted because the system is configured such that the air-fuel ratio feedback control is not started until the air-fuel ratio reaches a value corresponding to a stoichiometric air-fuel ratio and the unburned fuel quantity compensating value KUB is added when the air-fuel ratio feedback control starts.

In this embodiment, the system is configured such that after the air-fuel ratio sensor 17 has been determined to be active, the target air-fuel ratio revising coefficient TFBYA is decreased at a higher rate than the rate at which it was decreased before the air-fuel ratio sensor 17 was determined to be active. Afterwards, the air-fuel ratio feedback revising coefficient ALPHA is held at a reference value (1) for a prescribed amount of time and the air-fuel ratio feedback control is started after the prescribed amount of time has elapsed. As a result, the equivalence ratio λ can be adjusted to 1 at the maximum speed allowable in view of the operating performance of the engine without being restricted by the normal gain of the air-fuel ratio feedback control (i.e., the gain that is in effect in normal operating regions). In other words, when the air-fuel ratio is made to converge using the air-fuel ratio feedback revising coefficient ALPHA, it is necessary to increase the gain of the air-fuel ratio feedback revising coefficient ALPHA and this gain increase must be accomplished in a manner compatible with the requirements of other regions. In this embodiment, however, the slope can be set independently in the region immediately after the engine 1 is started. Also, even if the feedback control starts when the engine 1 is in a region where the air-fuel ratio is in a rich, overshooting resulting from excessive revision of the air-fuel ratio feedback revising coefficient ALPHA can be prevented.

With this embodiment, an accurate determination of whether or not the air-fuel ratio sensor 17 is active can be made because the determination is made based on the output (VO2) of the air-fuel ratio sensor 17 and the amount of time (T2#) elapsed since the engine 1 was started.

With this embodiment, the air-fuel ratio feedback control starts when the output of the air-fuel ratio sensor 17 has reached a value (SST#) corresponding to a stoichiometric air-fuel ratio. Thus, the air-fuel ratio is changed rapidly in a feed-forward manner until it is shifted from the rich region to the stoichiometric point and the air-fuel ratio feedback control is started when the air-fuel ratio is in the vicinity of λ=1. As a result, overshooting of the air-fuel ratio feedback revising coefficient ALPHA is prevented and exhaust emissions can be reduced.

With this embodiment, if the output of the air-fuel ratio sensor 17 has not reached a value (SST#) corresponding to a stoichiometric air-fuel ratio after a prescribed amount of time (T3#) has elapsed since the air-fuel ratio sensor 17 was determined to be active, the air-fuel ratio feedback control starts regardless of the air-fuel ratio. As a result, even if the air-fuel ratio continues to be rich for some reason, the feedback control can be started reliably and the air-fuel ratio can be brought to the stoichiometric value by the feedback control.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine air-fuel ratio control system comprising:

an air-fuel ratio setting section configured to set an air-fuel ratio for an engine based on at least one engine operating condition;

an air-fuel ratio sensor detection section configured determine a status of an air-fuel ratio sensor;

a target air-fuel ratio revision section configured to set a target air-fuel ratio revising coefficient to richen the air-fuel ratio immediately after the engine is started and afterwards to gradually decrease the air-fuel ratio over time to gradually converge towards a stoichiometric value, with the target air-fuel ratio revising coefficient decreasing at a higher rate upon determining the air-fuel ratio sensor to be active than a prior decreasing rate before determining the air-fuel ratio sensor to be active; and an air-fuel ratio feedback control section configured to set an air-fuel ratio feedback revising coefficient to perform an air-fuel ratio feedback control that converges the air-fuel ratio towards the stoichiometric value based on a signal from the air-fuel ratio sensor when an air-fuel ratio feedback control condition is satisfied, the air-fuel ratio feedback control section being further configured to hold the air-fuel ratio feedback revising coefficient at a reference value for a prescribed amount of time after the air-fuel ratio feedback control condition is satisfied and start the air-fuel ratio feedback control after the prescribed amount of time has elapsed.

2. The engine air-fuel ratio control system as recited in claim 1, wherein the air-fuel ratio sensor detection section is further configured to determine the air-fuel ratio sensor to be active based on an output of the air-fuel ratio sensor and an amount of time elapsed since the engine was started.

3. The engine air-fuel ratio control system as recited in claim 1, wherein the target air-fuel ratio revision section is further configured to calculate the target air-fuel ratio revising coefficient based on a stabilization fuel quantity increasing factor that is set such that the air-fuel ratio is richened immediately after the engine is started and afterwards is gradually decreased over time such that the air-fuel ratio gradually converges toward the stoichiometric value with the stabilization fuel quantity increasing factor being decreased at a predetermined decrease rate upon a determination that the air-fuel ratio sensor is active.

4. The engine air-fuel ratio control system as recited in claim 1, wherein the air-fuel ratio sensor detection section is further configured to determine the air-fuel ratio sensor to be active based on an output of the air-fuel ratio sensor indicating a value corresponding to a stoichiometric air-fuel ratio has been reached.

5. The engine air-fuel ratio control system as recited in claim 4, wherein the air-fuel ratio feedback control section is further configured to start the air-fuel ratio feedback control after a prescribed amount of time has elapsed since the air-fuel ratio sensor was determined to be active, regardless of the air-fuel ratio.

6. The engine air-fuel ratio control system as ecited in claim 2, wherein the target air-fuel ratio revision section is further configured to calculate the target air-fuel ratio revising coefficient based on a stabilization fuel quantity increasing factor that is set such that the air-fuel ratio is richened immediately after the engine is started and afterwards is gradually decreased over time such that the air-fuel ratio gradually converges toward the stoichiometric value with the stabilization fuel quantity increasing factor being decreased at a predetermined decrease rate upon a determination that the air-fuel ratio sensor is active.

7. The engine air-fuel ratio control system as recited in claim 2, wherein the air-fuel ratio sensor detection section is further configured to determine the air-fuel ratio sensor to be active based on an output of the air-fuel ratio sensor indicating a value corresponding to a stoichiometric air-fuel ratio has been reached.

8. The engine air-fuel ratio control system as recited in claim 7, wherein the air-fuel ratio feedback control section is further configured to start the air-fuel ratio feedback control after a prescribed amount of time has elapsed since the air-fuel ratio sensor was determined to be active, regardless of the air-fuel ratio.

9. The engine air-fuel ratio control system as recited in claim 3, wherein the air-fuel ratio sensor detection section is further configured to determine the air-fuel ratio sensor to be active based on an output of the air-fuel ratio sensor indicating a value corresponding to a stoichiometric air-fuel ratio has been reached.

10. The engine air-fuel ratio control system recited in claim 9, wherein the air-fuel ratio feedback control section is further configured to start the air-fuel ratio feedback control after a prescribed amount of time has elapsed since the air-fuel ratio sensor was determined to be active, regardless of the air-fuel ratio.

11. An engine air-fuel ratio control system comprising:

means for setting a air-fuel ratio for an engine based on at least one engine operating condition;

air-fuel ratio sensor detection means for determining a status of an air-fuel ratio sensor;

target air-fuel ratio revision means for setting a target air-fuel ratio revising coefficient to richen the air-fuel ratio immediately after the engine is started and afterwards to gradually decrease the air-fuel ratio over time to gradually converge towards a stoichiometric value, with the target air-fuel ratio revising coefficient decreasing at a higher rate upon determining the air-fuel ratio sensor to be active than a prior decreasing rate before determining the air-fuel ratio sensor to be active; and air-fuel ratio feedback control means for setting an air-fuel ratio feedback revising coefficient to perform an air-fuel ratio feedback control that converges the air-fuel ratio towards the stoichiometric value based on a signal from the air-fuel ratio sensor when an air-fuel ratio feedback control condition is satisfied, the air-fuel ratio feedback control means further holding the air-fuel ratio feedback revising coefficient at a reference value for a prescribed amount of time after the air-fuel ratio feedback control condition is satisfied and start the air-fuel ratio feedback control after the prescribed amount of time has elapsed.

12. A method of controlling an engine air-fuel ratio comprising:

setting the air-fuel ratio for an engine based on at least one engine operating condition;

determining a status of an air-fuel ratio sensor;

setting a target air-fuel ratio revising coefficient to richen the air-fuel ratio immediately after the engine is started and afterwards to gradually decrease the air-fuel ratio over time to gradually converge towards a stoichiometric value, with the target air-fuel ratio revising coefficient decreasing at a higher rate upon determining the air-fuel ratio sensor to be active than a prior decreasing rate before determining the air-fuel ratio sensor to be active;

setting an air-fuel ratio feedback revising coefficient to perform an air-fuel ratio feedback control that converges the air-fuel ratio towards the stoichiometric value based on a signal from the air-fuel ratio sensor when an air-fuel ratio feedback control condition is satisfied; and holding the air-fuel ratio feedback revising coefficient at a reference value for a prescribed amount of time after the air-fuel ratio feedback control condition is satisfied and starting the air-fuel ratio feedback control after the prescribed amount of time has elapsed.

13. The method as recited in claim 12, wherein the determining of the air-fuel ratio sensor to be active is based on an output of the air-fuel ratio sensor and an amount of time elapsed since the engine was started.

14. The method as recited in claim 12, wherein the setting of the target air-fuel ratio revising coefficient includes a stabilization fuel quantity increasing factor that is set such that the air-fuel ratio is richened immediately after the engine is started and afterwards is gradually decreased over time such that the air-fuel ratio gradually converges toward the stoichiometric value with the stabilization fuel quantity increasing factor being decreased at a predetermined decrease rate upon a determination that the air-fuel ratio sensor is active.

15. The method as recited in claim 12, wherein the determining of the status of the air-fuel ratio sensor to be active is based on an output of the air-fuel ratio sensor indicating a value corresponding to a stoichiometric air-fuel ratio has been reached.

16. The method as recited in claim 15, wherein the starting of the air-fuel ratio feedback control occurs after a prescribed amount of time has elapsed since the air-fuel ratio sensor was determined to be active, regardless of the air-fuel ratio.

* * * * *